United States Patent
Beaurepaire et al.

(10) Patent No.: US 8,284,483 B2
(45) Date of Patent: Oct. 9, 2012

(54) METHOD AND DEVICE FOR ACQUIRING SIGNALS IN LASER SCANNING MICROSCOPY

(75) Inventors: Emmanuel Jean-Marc Beaurepaire, Palaiseau (FR); Israel Veilleux, Quebec (CA); Nicolas Olivier, Paris (FR); Delphine Malvina Daniele Marie Debarre, Paris (FR); Jean-Louis Martin, Bures sur Yvette (FR)

(73) Assignee: Ecole Polytechnique, Palaiseau (FR)

( * ) Notice: Subject to any disclaimer, the term of this patent is extended or adjusted under 35 U.S.C. 154(b) by 0 days.

(21) Appl. No.: 13/147,232

(22) PCT Filed: Feb. 3, 2010

(86) PCT No.: PCT/FR2010/050173
§ 371 (c)(1),
(2), (4) Date: Aug. 1, 2011

(87) PCT Pub. No.: WO2010/089504
PCT Pub. Date: Aug. 12, 2010

(65) Prior Publication Data
US 2011/0296562 A1 Dec. 1, 2011

(30) Foreign Application Priority Data
Feb. 4, 2009 (FR) .................................. 09 50693

(51) Int. Cl.
*H01J 3/14* (2006.01)
*G01B 9/00* (2006.01)
*G01B 11/00* (2006.01)
*G01Q 60/00* (2010.01)

(52) U.S. Cl. ............. 359/382; 359/368; 359/201.1; 356/3.09; 356/141.4; 356/629; 850/21

(58) Field of Classification Search ............ 356/3.09, 356/141.4, 629; 359/382, 368, 201.1; 850/21
See application file for complete search history.

(56) References Cited

U.S. PATENT DOCUMENTS

| | | | |
|---|---|---|---|
| 5,034,613 A | 7/1991 | Denk et al. | |
| 6,028,306 A | 2/2000 | Hayashi | |
| 6,740,868 B1 | 5/2004 | Knebel et al. | |
| 7,227,127 B2 * | 6/2007 | Saggau et al. | 250/235 |
| 7,561,326 B2 * | 7/2009 | Funk et al. | 359/368 |
| 7,609,391 B2 * | 10/2009 | Betzig | 356/521 |
| 7,990,611 B2 * | 8/2011 | Betzig | 359/385 |
| 2002/0147568 A1 | 10/2002 | Wenzel et al. | |

(Continued)

FOREIGN PATENT DOCUMENTS

CA 2267431 A1 2/1999

(Continued)

OTHER PUBLICATIONS

Marsh P N et al: "Practical implementation of adaptive optics in multlphoton microscopy", Optics Express, May 2003 Optical Society of America US, vol. 11, No. 10, May 2003, pp. 1123-1130, XP002538472.

(Continued)

*Primary Examiner* — Nikita Wells
(74) *Attorney, Agent, or Firm* — Young & Thompson

(57) ABSTRACT

A method for acquiring signals in laser scanning microscopy, includes the steps of: moving a focused optical excitation beam relative to an object to be measured so that the focus point of the beam follows a predetermined path in the space of the object; and acquiring optical measurement signals along the path according to at least one acquisition parameter; characterized in that the path of the excitation beam is determined so as to substantially minimize the variations of the optical properties of at least one portion of the environments crossed by the excitation beam between consecutive acquisitions, and in that at least one acquisition parameter among the acquisition parameters is modulated during the movement of the excitation beam. A device for implementing the method is also described.

20 Claims, 2 Drawing Sheets

U.S. PATENT DOCUMENTS

2004/0095576 A1   5/2004   Wolleschensky
2006/0012871 A1   1/2006   Funk et al.
2006/0071143 A1   4/2006   Saggau et al.

FOREIGN PATENT DOCUMENTS

| | | |
|---|---|---|
| DE | 19733193 A1 | 2/1999 |
| EP | 1767980 A | 3/2007 |
| WO | 2004/079405 A2 | 9/2004 |

OTHER PUBLICATIONS

French Search Report, dated Jul. 24, 2009, in Application No. FR 0950693.

International Search Report, dated Apr. 26, 2010, in PCT/FR2010/050173.

* cited by examiner (a) Art antérieur          (b)

(a)          (b)

METHOD AND DEVICE FOR ACQUIRING SIGNALS IN LASER SCANNING MICROSCOPY

TECHNICAL FIELD

The invention relates to a method and device for acquiring signals in laser scanning microscopy, providing for optimization of acquisition as a function of the object to be measured.

The field of the invention is more particularly, but non-limitatively, that of confocal microscopy, fluorescence microscopy and nonlinear or multiphoton microscopy.

PRIOR ART

The term optical scanning microscopy, or laser scanning microscopy, covers a set of imaging techniques with the common feature of being based on scanning of the volume of an object by a focused beam of light to obtain information on its structure. These techniques comprise in particular confocal microscopy, fluorescence microscopy and nonlinear or multiphoton microscopy.

Laser scanning microscopy techniques are particularly well suited to the imaging of diffusing media, in particular biological, since they make it possible to detect, with high selectivity, the interactions between the excitation photons and the medium that take place in the focus zone of the excitation beam, while not being very sensitive at all to the photons diffused elsewhere in the volume.

The acquisition of signals therefore essentially comprises scanning of the volume of the object to be measured by the focal point of the excitation beam and collection of light diffused or emitted by fluorescence at this focal point. The scanning mode used most frequently in the devices of the prior art consists of the acquisition of measurements along a plane or sequence of planes, usually along a line-by-line path known as a "raster scan". The lateral scanning of the measurement beam is most frequently implemented by rapid elements such as mirror scanners.

For example, document U.S. Pat. No. 5,034,613 by Denk et al. is known, wherein the excitation beam is deflected by two mirror scanners to scan a grid of points in a plane perpendicular to the axis of the system, while the depth of this plane is adjusted by focusing means.

In some applications, in biology in particular, it is particularly important to minimise the acquisition time of the volume of data, in order, for example, that the measurements are not disturbed by movements or are able to follow changing phenomena. In this case, use is often made of acousto-optic elements, which make it possible to achieve higher scanning rates.

For example, document U.S. Pat. No. 7,227,127 by Saggau et al. is known, which describes a three-dimensional scanning device based on acousto-optic elements, which makes it possible rapidly to acquire points at any positions in a volume. The applications of this device relate more particularly to the neurosciences, in particular the simultaneous monitoring of the changes over time at particular measurement sites in nonlinear microscopy.

Imaging of diffusing or complex media is faced with another difficulty, which is the high variability of the measurement conditions in the sample. Of particular note are:

Optical losses due to the absorption and diffusion of photons in the sample, which increase exponentially with measurement depth. These losses, which are variable, may considerably increase the dynamic detection requirements;

Spatial degradations of the excitation beam, which comprise in particular variation of the aberrations with the measurement depth in the sample, associated with the difference in the refractive index between the latter and the medium of immersion of the focusing lens. These spatial degradations may substantially enlarge the size of the focus zone of the beam and thus have a considerable impact on the resolution of the measurements and the effectiveness of the nonlinear microscopy processes;

Local optical or spectroscopic properties of the medium at the origin of the signal detected, which may vary according to the zone or depth imaged.

The imaging of such media may be substantially improved by introducing compensating devices that correct the geometry of the excitation beam and adapt the acquisition parameters as a function of the measurement position and the structure of the sample. Document U.S. Pat. No. 6,740,868 by Knebel et al. is known, which describes a method for regulating the power of the laser source during acquisition, by means of an acousto-optic element inserted into the path of the excitation beam. The attenuation of the acousto-optic element can be pre-programmed as a function of the depth of the plane in which the measurement is made, so as to compensate for example for the losses in the sample, which would have been estimated in advance.

In the imaging of objects of any shape, in particular spherical objects in biology, it would be very useful to be able to implement a correction or adaptation of the excitation beam as a function not only of the depth Z as in U.S. Pat. No. 6,740,868, but also of the position of the measurement point in the X-Y plane. However, such a correction implemented on a device, which would sample measurement points according to a fixed regular pattern, could result in excessively long acquisition times owing to the relatively slow reaction of elements which can be used for example for the spatial shaping of the beam (liquid crystal devices, deformable mirrors, micro-mirror devices, liquid lenses, variable focus lenses, etc) and, above all owing to the fact that the compensations may vary greatly from one measurement point to another, depending on the topography of the sample.

The purpose of this invention is therefore to propose a method and a device for acquiring signals in laser scanning microscopy, providing for the optimization of acquisition as a function of the object to be measured.

DISCLOSURE OF THE INVENTION

This aim is achieved with a method for acquiring signals in laser scanning microscopy, including stages of:
relative movement of a focused optical excitation beam and an object to be measured such that the focal point of said beam runs along at least one predetermined path in the volume of said object, and
acquisition of optical measurement signals along said path according to at least one acquisition parameter, characterised in that
the path of the excitation beam is determined so that the variations in the optical properties of at least a portion of the media passed through by said excitation beam are substantially minimised between successive acquisitions, and
in that at least one acquisition parameter among said acquisition parameter(s) is modulated during the movement of said excitation beam.

This minimisation of the variations in the optical properties of the media passed through may comprise minimisation of the variations in the spectroscopic properties of said media, i.e. the properties affecting the light spectrum.

According to a particularly advantageous characteristic of the method according to the invention, the path of the excitation beam is determined so that the physical parameters associated with the optical system and the object to be measured, which are likely to disturb the acquisition, vary substantially more slowly during scanning than in the case of traditional scanning not adapted to the object.

This provides for the more effective implementation of means for adapting the acquisition parameters during measurement, even with quite slow response times, while minimising the global acquisition time. Furthermore, the accuracy of the correction may be substantially improved thanks to better progressiveness.

According to another advantageous characteristic of the method according to the invention, the path of the excitation beam and the acquisition of signals and data may be limited to the volume of the sample, so as to avoid the acquisition of needless, and above all time-consuming, data.

According to particular embodiments, the excitation beam can run along at least one path situated in a mean plane substantially perpendicular to the axis of the measurement system, and said path can be determined so as to conform substantially with the contours of the surface of the object to be measured as projected in said mean plane. Thus it is possible substantially to reduce or even to minimise the variations in depth of the focal point of the beam in the object between successive acquisitions in order in particular to adapt any acquisition parameters dependent on it during measurement;

the path of the excitation beam can be determined so as to conform substantially with the symmetries of the optical conditioning system of said excitation beam. Thus it is possible substantially to reduce or even to minimise the variations in optical aberrations undergone by the beam between successive acquisitions, in order in particular to adapt any acquisition parameters dependent on it, during measurement;

the path of the excitation beam can be determined so as to conform substantially with the distribution of the optical and in particular spectroscopic properties of the media passed through at the origin of the measurement signal. Thus it is possible for example to minimise the variations in a fluorescence signal between successive acquisitions, in order in particular to adapt any acquisition parameters dependent on it during measurement.

the determination of the path of the excitation beam may comprise the use a priori knowledge of the shape of the object to be measured;

the determination of the path of the excitation beam may comprise the use of acquired preliminary data to determine the shape of the object to be measured;

the determination of the path of the excitation beam may comprise the use of acquired preliminary data to determine the distribution of the optical and in particular spectroscopic properties of the object to be measured;

the path du excitation beam may be substantially in the shape of a spiral;

the modulated acquisition parameters may comprise at least one parameter among: excitation power, spatial shaping of the excitation beam, spectral shaping of the excitation beam, temporal shaping of the excitation beam, polarization of the excitation beam, velocity of movement of the excitation beam, and measurement acquisition time;

at least one acquisition parameter among excitation power, velocity of movement of the excitation beam, temporal shaping of the excitation beam and measurement acquisition time may be modulated so as substantially to compensate for the optical losses in the object to be measured;

the spatial shaping of the excitation beam may be modulated so as substantially to compensate for the aberrations undergone by said excitation beam;

at least one acquisition parameter among spatial shaping, spectral shaping and temporal shaping may be modulated so as substantially to compensate for the local variations in the optical and in particular spectroscopic properties and of the media passed through.

According to another aspect of the invention, a device for acquiring signals in laser scanning microscopy is proposed, including:

means for producing an optical excitation beam, means for focusing said beam inside an object, means for moving said focused beam along at least one predetermined path, and means for acquiring optical measurement signals along said path according to at least one acquisition parameter, characterised in that it also comprises:

means for modulating at least one parameter among said acquisition parameter(s) during the movement of said excitation beam, the path of said excitation beam being determined so that the variations in the optical properties of at least a portion of the media passed through by said excitation beam between successive acquisitions are substantially minimised.

According to particular aspects, the means for moving the beam may comprise means for deflecting the excitation beam in at least one direction;

said means for deflecting the excitation beam may comprise at least one element among a mirror scanner and an acousto-optic element;

the device according to the invention may also comprise means for moving the object to be measured in at least one direction;

the device according to the invention may also comprise means for measuring at least one parameter among the position and the instantaneous velocity of the excitation beam relative to the object to be measured;

the device according to the invention may also comprise means for shaping the excitation beam;

the means for shaping the excitation beam may comprise at least one element among a liquid crystal device, a deformable mirror, a spatial light modulator, a micromirror device, a liquid lens and a variable focus lens.

According to a preferential but non-limitative embodiment, the method according to the invention may advantageously be integrated into laser scanning microscopes such as for example:

confocal microscopes, using fluorescence or otherwise, in which high spatial resolution is obtained thanks to the combination of spatial filters inserted into the optical system, and nonlinear or multiphoton microscopes, the measurement principle of which is based on emission or diffusion phenomena brought about by the simultaneous interaction of several photons with a structure of the sample.

In laser scanning microscopy and in particular for the measurement of voluminous diffusing objects such as biological samples, the measurement conditions may be substantially affected by the depth in the sample at which a measurement is made, in particular owing to:

- absorption or incoherent diffusion by the sample, which may bring about an exponential decrease, depending on the depth, in the intensity of the excitation beam at the focal point. The consequences may be problems with detection dynamics and also a lack of delivered intensity in the case of nonlinear microscopy;
- heterogeneities in the refractive index within the sample or between the sample and the immersion medium, which may induce aberrations in the wave front of the focused beam and thus give rise to an enlargement of the focus zone. The consequences may be a loss of spatial resolution in the measurements and also a lack of delivered intensity in the case of nonlinear microscopy;

The measurement conditions may also be substantially affected by other effects, such as for example variation of the aberrations in the optical system itself, as a function of the position of the excitation beam during scanning.

Advantageously, it is possible in a device implementing the method according to the invention significantly to improve the quality of the measurements by modulating or causing changes to the acquisition parameters during scanning, depending in particular on the position of the excitation beam in the sample and/or with respect to the optical system itself.

Adaptation of the acquisition parameters may relate in particular, non-limitatively, to:

- the photon balance of the excitation and detection chain. For this purpose, it is possible to use for example one or more methods among: modulation of the power of the source, modulation of the rate of light pulses, modulation of the transmission of a variable optical element such as a liquid crystal device, modulation of the scanning rate of the beam or the measurement integration time;
- the spatial shaping of the excitation beam, so as to correct the optical aberrations undergone. This spatial shaping can be implemented using for example one or more of the following devices: deformable mirror, micro-mirror device (DMD), liquid crystal matrix or spatial light modulator (SLM), liquid lens, variable focus lens;
- the spectral shaping of the excitation beam,
- shaping of the measurement beam.

Also, adaptation of the acquisition parameters in a device according to the invention may comprise open-loop operations as well as closed-loop operations, using for example information taken from sensors measuring a wave front of the excitation beam or emitted or reflected light intensity.

The existing components which can be used to adapt acquisition parameters (in particular shaping of the excitation beam) to local measurement conditions often have the disadvantage of having very slow reaction times with respect to the usual acquisition rates in laser scanning microscopy. For example, it is usual to have acquisition rates of the order of a few microseconds per image pixel, while a deformable matrix or a liquid crystal matrix has a response time of the order of a millisecond or more. Implementation of such components without care may thus result in unacceptable acquisition times.

According to a particularly advantageous characteristic of the method according to the invention, the path of the excitation beam may be optimised so as to minimise the performance required of the means for adapting acquisition parameters and thus achieve an optimum between the acquisition time and the demands on the adaptation means. This result can be obtained in particular with a compliant path, i.e. adapted to the shape of the sample.

According to the method according to the invention, the choice of paths and acquisition parameter adaptation strategies can be implemented for example:

- on the basis of a priori knowledge on the sample, the global nature and shape of which are often well known in biology in particular;
- on the basis of one or more sequences of prior measurements, possibly on a limited number of points, to determine for example the shape of the object, other parameters such as a coefficient of absorption, etc.;
- or on the basis of a combination of a priori knowledge and measurements.

The method according to the invention is not of course limited to imaging of spherical or cylindrical objects. In fact, the principle of conformal scanning may be advantageously applied to multiple sample shapes, including those with sharp angles.

The method according to the invention also makes it possible advantageously to correct aberrations, in particular with radial symmetry, of the optical system itself. In fact, scanning with cylindrical symmetry, for example in a circle or spiral, makes it easier to implement a device for shaping a wave front such as a deformable mirror or spatial light modulator (SLM) to correct such aberrations.

DESCRIPTION OF FIGURES AND EMBODIMENTS

Other advantages and characteristics of the invention will become apparent on examination of the detailed description of implementations and embodiments which are in no way limitative, and the attached diagrams, in which:

FIG. 1 presents a diagrammatic view of a device according to the invention,

FIG. 2 presents an example of adaptive scanning optimized for a spherical object, FIG. 3 illustrates the variation over time in the measurement depth in a spherical object for different scanning modes, FIG. 4 presents examples of real measurements made on a biological sample in non-linear microscopy.

With reference to FIG. 1, a device according to the invention comprises a light source 1 emitting an excitation beam 2, such as for example a femtosecond laser pulse. This light source 1 may be adjustable, in particular in intensity or temporally (width, duration, rate and spectral phase of the pulses, etc).

The excitation beam 2 is shaped spatially by conditioning means 3, which may comprise, non-limitatively:

optical components such as lenses, fixed or moving, making it possible spatially to shape the excitation beam 2 and adjust its focusing distance;

components providing for conditioning of the excitation beam 2, possibly during measurements, in order for example to shape its wave front, control optical aberrations, vary its intensity, control its spectral content or modulate it temporally. These components may comprise in particular liquid crystal devices, deformable mirrors, micro-mirror devices, liquid lenses.

The device according to the invention comprises scanning means 5, which provide for scanning the sample at least laterally, and possibly also in depth, with the excitation beam 2. These scanning means comprise for example non-resonating mirror scanners and/or acousto-optic elements. They may be supplemented or replaced by means for moving the sample 7.

The device according to the invention also comprises:
- a focusing module 6, which concentrates the light of the excitation beam in a zone of the sample to be measured 7 and collects the diffused or emitted light 8;
- a measurement beam separation module 8 possibly including means of spectral separation and/or polarisation;
- a detection module 9.

In a particular embodiment, the device may comprise means for collection and measurement during transmission, through the sample.

The device according to the invention also comprises a scanning control unit 10, also known as a Conformal Scanning Controller or CSC. This scanning control unit 10 may be implemented for example by an electronic module including a microcontroller or an FPGA, by software functions integrated into a driver program on a computer or by a combination of the two.

The functions of the control unit 10 include control of scanning of the sample by the excitation beam along at least one predetermined path by driving the scanning means 5 and possibly the conditioning means 3. This path may be stored in the CSC for example in the form of a sequence of points or a mathematical model.

The functions of the CSC 10 may also comprise conditioning of the excitation beam with respect to the measurement position by driving at least one among the scanning means 5, the conditioning means 3, the source 1 and the detection means 9. The method for conditioning may also be stored in the CSC for example in the form of a sequence of operating points or mathematical models.

The CSC may also make use of information originating from the different modules such as the scanning module 5, the conditioning module 3, the source 1 and the detection modules 9 to control the scanning and control the conditioning of the excitation beam.

The device as presented in FIG. 1 of course corresponds to a preferential but in no way limitative embodiment of the method according to the invention.

The method according to the invention is implemented on a nonlinear scanning microscope making it possible to perform two-photon imaging on biological samples. The scanning means 5 comprise two non-resonating mirror scanners. The CSC 10 makes it possible to drive these scanners along pre-programmed paths and also to modulate the excitation power of the source 1.

This device implements a conformal path, as illustrated in FIG. 2 in the case of a spherical object 7 representative for example of an embryo or an egg.

The acquisition of data is performed along a succession of X-Y section planes 21, each corresponding to a distance Z 22 along the optical axis of the device.

In each X-Y plane with given depth Z, the excitation beam scans a path calculated so as to conform substantially to the contours of the surface of the sample, as they would appear in a projection in this plane 21. Thus, the variation in depth H 25 in the sample between successive acquisition points is substantially reduced or minimised.

The acquisition device according to the invention may be programmed to search for a path, which also makes it possible substantially to reduce or even minimise the dynamic demands on the scanning device, in particular to enhance its accuracy. This leads to the choice of a spiral path 26 for analysis of a spherical object 7.

In order to optimise the global acquisition time, it is also possible to limit the acquisition zone to the effective size of the sample, by executing for example, in the case of FIG. 1, a path such as 27 in the plane 21a and a path such as 26 in the plane 21b.

FIG. 3 illustrates the advantage of a conformal path adapted to the sample 7 to implement means of adaptation of the acquisition parameters:
- the sample considered is still the spherical sample 7 in FIG. 1,
- the sectional plane illustrated is the plane 21b,
- the magnitude of influence taken into account is the depth H of the measurement point in the object, which particularly affects, for example, the absorption undergone by the excitation beam.

FIG. 3a shows the changes over time in the depth H during scanning in the shape of a grid ("raster scan") representative of the prior art, while FIG. 3b illustrates the changes over time in the same depth H during conformal spiral scanning 26. It can be seen that, in the case of conformal scanning, the parameter H varies far more slowly and monotonously, which considerably relaxes the requirements in terms of the dynamic specifications of the means for adaptation of the acquisition parameters, which would follow the changes in H.

FIG. 4a shows an optical section in depth performed in the traditional manner with raster scanning and with no adaptation of the acquisition parameters. The signal is greatly attenuated in the centre of the field with respect to the periphery, which considerably degrades the quality of the information collected.

Figure 1:
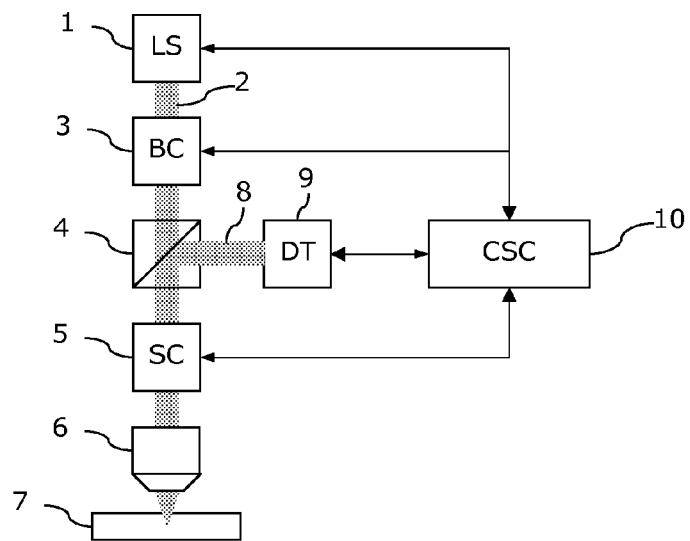
Figure 2:
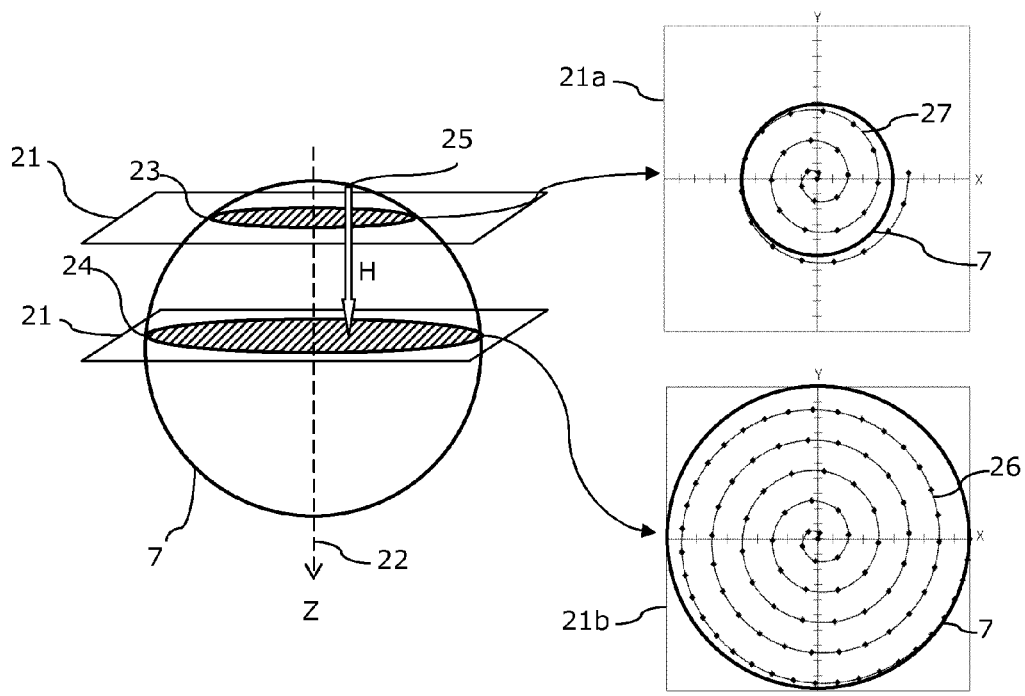
Figure 3:
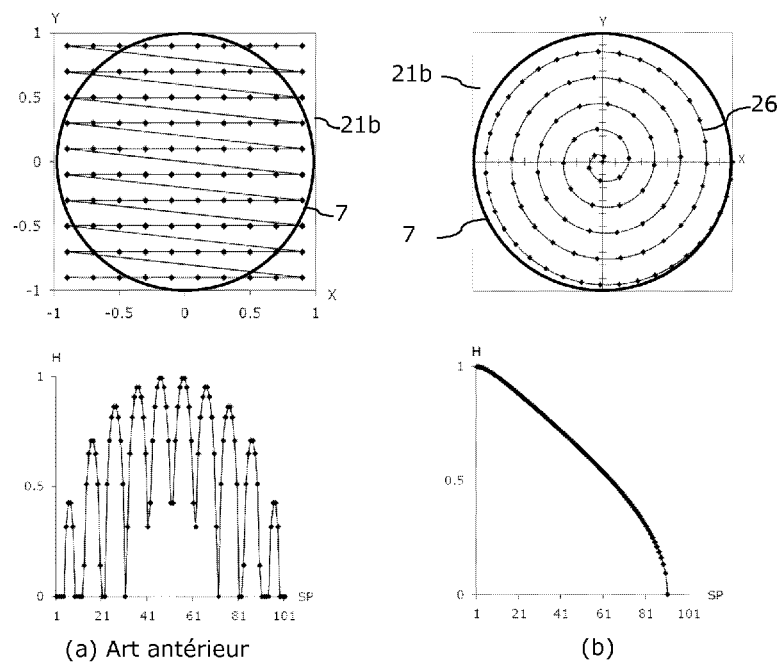
Figure 4:
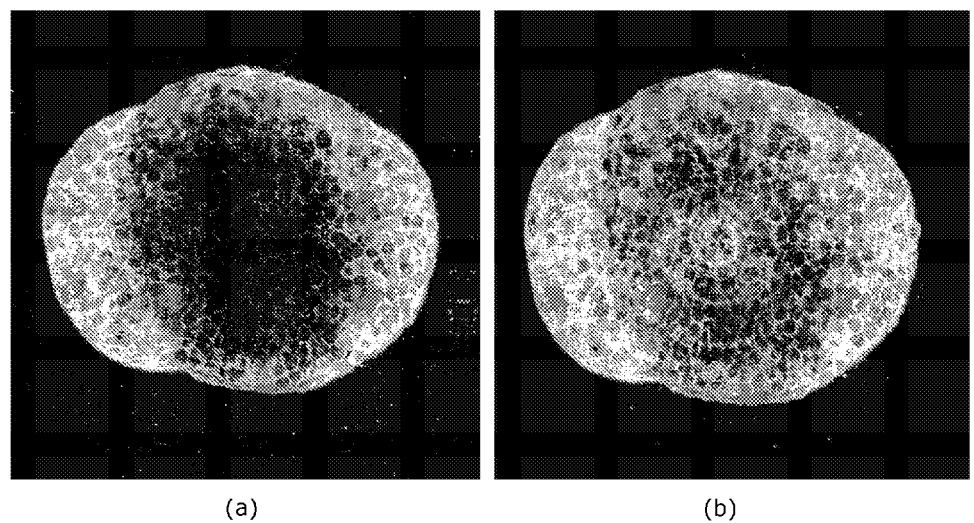
FIG. 4 illustrates examples of image acquisition performed by a device according to the invention on fish embryos, substantially spherical in shape.

FIG. 4b shows an optical section in depth performed in accordance with the method according to the invention with spiral scanning during which the beam's scanning velocity is modulated continuously from the centre towards the edge. All of the field of view can thus be imaged correctly, without increasing the acquisition time or degrading the peripheral regions owing to an increase in the excitation intensity. Such a result cannot be obtained with raster scanning owing in particular to the dynamic demands this would impose on the scanning system.

The method according to the invention is applicable in particular, non-limitatively:
- for controlling the spatial and temporal shape of the focal volume in scanning microscopy in general;
- in the traditional fields of application of nonlinear or confocal microscopy, in biology and medicine (observation of thick tissues), with in particular three-dimensional imaging of non-planar objects such as embryos, spheroid tumours, etc;
- more generally in other fields such as the description of materials.

According to particular embodiments, the method according to the invention may also be implemented to correct aberrations and shape the beam during ablation at depth of non-planar objects, in the context of surgery or laser micromachining.

Of course, the invention is not limited to the examples which have just been described and numerous adjustments can be made to these examples without exceeding the scope of the invention.

The invention claimed is:

1. Method for acquiring signals in laser scanning microscopy, including stages of:
   relative movement of a focused optical excitation beam (2) and an object (7) to be measured so that the focal point of said beam (2) runs along at least one predetermined path (26) in the volume of said object (7), and
   acquisition of optical measurement signals along said path (26) according to at least one acquisition parameter,
   characterised in that
   the path (26) of the excitation beam is determined so that the variations in the optical properties of at least one portion of the media passed through by said excitation beam (2) affecting the propagation of said excitation beam are substantially minimised between said acquisitions of optical measurement signals, and
   in that at least one acquisition parameter among said acquisition parameter(s) is modulated during the movement of said excitation beam (2).

2. Method according to claim 1, characterised in that the minimisation of the variations in the optical properties of the media passed through comprises a minimisation of the variations in the spectroscopic properties of said media.

3. Method according to claim 1, characterised in that
   the excitation beam runs along at least one path (26) situated in a mean plane (21) substantially perpendicular to the axis (22) of the measurement system, and
   said path (26) is determined so as to conform substantially with the contours of the surface of the object (7) to be measured as projected in said mean plane (21).

4. Method according to claim 1, characterised in that the path (26) of the excitation beam is determined so as to conform substantially with the symmetries of the optical conditioning system of said excitation beam.

5. Method according to claim 1, characterised in that the path (26) of the excitation beam is determined so as to conform substantially with the distribution of the optical and in particular spectroscopic properties of the media passed through at the point of origin of the measurement signal.

6. Method according to claim 1, characterised in that the determination of the path (26) of the excitation beam comprises the use of prior knowledge of the shape of the object to be measured (7).

7. Method according to claim 1, characterised in that the determination of the path (26) of the excitation beam comprises the use of preliminary data acquired to determine the shape of the object to be measured (7).

8. Method according to claim 1, characterised in that the determination of the path (26) of the excitation beam comprises the use of preliminary data acquired to determine the distribution of the optical and in particular spectroscopic properties of the object to be measured (7).

9. Method according to claim 1, characterised in that the path (26) of the excitation beam is substantially in the shape of a spiral.

10. Method according to claim 1, characterised in that the modulated acquisition parameters comprise at least one parameter among:
    excitation power,
    spatial shaping of the excitation beam,
    spectral shaping of the excitation beam,
    temporal shaping of the excitation beam,
    polarisation of the excitation beam,
    velocity of movement of the excitation beam,
    measurement acquisition time.

11. Method according to claim 10, characterised in that at least one acquisition parameter among excitation power, velocity of movement of the excitation beam, temporal shaping of the excitation beam and measurement acquisition time is modulated so as substantially to compensate for the optical losses in the object to be measured (7).

12. Method according to claim 10, characterised in that the spatial shaping of the excitation beam (2) is modulated so as substantially to compensate for the aberrations undergone by said excitation beam.

13. Method according to claim 10, characterised in that at least one acquisition parameter among spatial shaping, spectral shaping and temporal shaping of the excitation beam (2) is modulated so as substantially to compensate for the local variations in the optical and in particular spectroscopic properties and of the media passed through.

14. Device for acquiring signals in laser scanning microscopy, including:
    means (1) for producing an optical excitation beam (2),
    means (6) for focusing said beam (2) inside an object (7),
    means (5) for moving said focused beam (2) along at least one predetermined path (26), and
    means for acquiring (9) optical measurement signals (8) along said path according to at least one acquisition parameter,
    characterised in that it also comprises:
    means (3, 10) for modulating at least one parameter among said acquisition parameter(s) during the movement of said excitation beam,
    the path (26) of said excitation beam (2) being determined so that the variations in the properties of at least one portion of the media passed through by said excitation beam affecting the propagation of said excitation beam are substantially minimised between said acquisitions of optical measurement signals.

15. Device according to claim 14, characterised in that the means for moving the beam (2) comprise means for deflecting (5) the excitation beam in at least one direction.

16. Device according to claim 15, characterised in that the means for deflecting (5) the excitation beam (2) comprise at least one element among a mirror scanner and an acousto-optic element.

17. Device according to claim 14, characterised in that it also comprises means for moving the object to be measured (7) in at least one direction.

18. Device according to claim 14, characterised in that it also comprises means for measuring at least one parameter among the position and the instantaneous velocity of the excitation beam (2) relative to the object to be measured (7).

19. Device according to claim 14, characterised in that it also comprises means for shaping (3) the excitation beam (2).

20. Device according to claim 19, characterised in that the means for shaping (3) the excitation beam (2) comprise at least one element among a liquid crystal device, a deformable mirror, a spatial light modulator, a micro-mirror device, a liquid lens and a variable focus lens.

* * * * *